(12) United States Patent
De Castro et al.

(10) Patent No.: US 7,944,346 B2
(45) Date of Patent: May 17, 2011

(54) DATA GATHERING SYSTEM FOR FLEET MANAGEMENT

(75) Inventors: Jose Orlando Gomes De Castro, Sao Paulo (BR); Airton Domingos Moreno, Sao Paulo (BR)

(73) Assignee: The Goodyear Tire & Rubber Company, Akron, OH (US)

( * ) Notice: Subject to any disclaimer, the term of this patent is extended or adjusted under 35 U.S.C. 154(b) by 415 days.

(21) Appl. No.: 12/055,724

(22) Filed: Mar. 26, 2008

(65) Prior Publication Data

US 2008/0238678 A1 Oct. 2, 2008

(30) Foreign Application Priority Data

Mar. 27, 2007 (BR) ...................................... 0701225

(51) Int. Cl.
*B60C 23/00* (2006.01)
(52) U.S. Cl. ..................... 340/442; 340/572.1; 340/10.1; 73/146
(58) Field of Classification Search .... 340/572.1–572.8, 340/10.1, 539.13, 539.1, 500, 442; 235/375, 235/385; 73/146–146.8
See application file for complete search history.

(56) References Cited

U.S. PATENT DOCUMENTS

| | | | |
|---|---|---|---|
| 5,977,870 A * | 11/1999 | Rensel et al. ................. | 340/447 |
| 6,036,179 A * | 3/2000 | Rensel ........................... | 340/447 |
| 6,087,930 A * | 7/2000 | Kulka et al. ................... | 340/447 |
| 6,825,758 B1 * | 11/2004 | Laitsaari ........................ | 340/442 |
| 6,826,951 B1 * | 12/2004 | Schuessler et al. ............. | 73/146 |
| 6,885,296 B2 * | 4/2005 | Hardman et al. ............. | 340/10.1 |
| 6,995,672 B1 * | 2/2006 | Yones ........................ | 340/572.1 |
| 7,161,476 B2 * | 1/2007 | Hardman et al. ............. | 340/442 |
| 7,348,878 B2 * | 3/2008 | Fogelstrom ................... | 340/442 |
| 7,623,025 B2 * | 11/2009 | Miller ....................... | 340/426.33 |
| 7,652,561 B2 * | 1/2010 | Pimort ........................ | 340/447 |
| 2002/0130771 A1 * | 9/2002 | Osborne et al. ............... | 340/438 |
| 2003/0080862 A1 * | 5/2003 | Kranz ........................... | 340/442 |
| 2007/0135179 A1 * | 6/2007 | Hardman et al. ............. | 340/447 |
| 2007/0156312 A1 * | 7/2007 | Breed et al. ..................... | 701/29 |
| 2007/0222568 A1 * | 9/2007 | Morar et al. .................. | 340/447 |
| 2007/0222614 A1 * | 9/2007 | Rapp .......................... | 340/572.8 |
| 2008/0117028 A1 * | 5/2008 | Karstens .................... | 340/10.51 |

* cited by examiner

*Primary Examiner* — Eric M Blount
(74) *Attorney, Agent, or Firm* — Richard B. O'Planick

(57) ABSTRACT

A system for a vehicle fleet management comprises a transponder (1) located in the interior of a tire (2) or being integrated into a tire (2); a control unit (3) installed at the vehicle, the control unit (3) being configured to be able to read or receive and at least temporarily store data of the vehicle and/or data of the tire (2); a data providing means (5) which is configured to be able to provide tire pressure data and/or the tire groove deepness data of the tire (2); and a data gathering means (4) being configured to be able to read or receive data from the transponder (1), said data being present data and/or historical data of the tire (2). The data gathering means (4) is further configured to be able to read or receive tire pressure data and/or tire groove deepness data from the data providing means (5), and to provide data received from the transponder (1) and data received from the data providing means (5) to the control unit (3) and to a remote database (6).

4 Claims, 4 Drawing Sheets

DATA GATHERING SYSTEM FOR FLEET MANAGEMENT

FIELD OF THE INVENTION

The present invention relates to a system for fleet management using a transponder and a data gathering means. More specifically, the invention relates to a system that allows a traceability and identification of tires, the management of the status of at least one or each tire on a vehicle.

In an aspect of the invention, a passive transponder is placed in the interior of each tire, an intelligent control unit stores vehicle data, a data gatherer is equipped with a software for fleet management, a reader of pressure and grooves deepness is provided, and a remote database and a software for PC for fleet management is provided.

Such a system provides a series of practical and economical advantages including reduced process costs.

BACKGROUND OF THE INVENTION

In the ceaseless search for improving the performance of the tires, the monitoring of tires is in the interest of several companies within this market segment. Particularly in fleets of trucks and buses, the tires are one of the items of most serious wearing out and, consequently, of the highest cost for these companies. Thus it is very advantageous to maximize their useful lives.

Many companies developed processes for monitoring through telemetry systems regarding the physical statuses of a tire, like rotation, temperature, pressure and other items; however, the readers, being presently utilized for the reading of the transponders installed in the tires, are generic equipments, without a dedicated software for the task of data gathering in the fleet. When a more detailed data gathering is necessary, the transponder reader works in conjunction with a palmtop or notebook (utilized as data gatherers). A specific software for information entry is developed for such equipment. The transponder reader feeds that software, transmitting the number that identifies the element that is being worked out. That construction of equipment requires two expensive equipments, the transponder reader and the palmtop or notebook, the development of a software for the tires management and the integration of the software and the gatherer with the transponder reader, requiring qualified technical work, normally not available at the transportation companies and other fleets. In addition to that, the usability of the set is uncomfortable requiring the handling of two equipments in the field.

With the purpose of covering such needs, there are some conventional management systems that utilize cards or looseleaf books for the data gathering, visual fire marking for identification of the tires and visual code to identify the vehicle. Some of them utilize a PC software for entry and management of the gathered data. When the vehicle comes back to the fleet, an operator grabs the card regarding it and performs the data gathering. It is verified, in a visual way and manually, the identification and the place of each tire in the vehicle, the deepness of the grooves and the internal pressure of the tires. The gathered data are written on the card and they are sent to another operator who receives them and transcribes the data to the management software.

Such conventional management systems are slow also due to the difficulty to read the tire identification data particularly of internal tires of vehicles with double rounding. They are also imprecise due to the abrasion of the fire marking of tires identification and the mistakes in the reading and transcription that are performed in a manual way.

Consequently, in order to solve the aforementioned inconveniences, a system and a data gathering means according the present invention has been developed for fleet management which can be used by transportation companies, bus companies or other companies that have a need of managing the use and wearing of their tires, and which fully meets the proposed purposes, providing a series of practical and economical advantages, reducing equipment costs and offering a better cost/benefit relationship and important differentials as compared with the conventional systems and readers.

SUMMARY OF THE INVENTION

In accordance with one aspect of the present invention, a system for management of fleets is proposed, wherein a passive transponder, "read/write", for identification of the tires, is placed in the interior of each tire by using any conventional method as utilized in the market; and it is also installed in the vehicle as control unit an Intelligent Control Unit ("UNICO") for identification and storage of vehicle data, a data gatherer that performs the reading of the tire transponder as indicated by the gatherer, that, in this way, it knows the tire present and historical data, and a reader for pressure and the grooves deepness, that complements the information and those data are sent from the gatherer to the UNICO and, for instance via GPRS or USB, to a remote database, where a software for fleets management receives the data and the events as gathered at the remote base, allowing the information analysis.

In another aspect of the invention, the UNICO may store data such as the identification of the vehicles and the tires, the respective data regarding pressure, temperature, groove measures, kilometers run and/or worked hours, data about the motor operation that are directly gathered from the vehicle electronic unit, position of each tire in the vehicle and useful life status of the tires (new or retreaded).

In a further aspect of the invention, the UNICO is utilized as a unit that locally stores the data about the vehicle and the tire, avoiding the need of a database at the gatherer or consultation to a remote database.

In yet a further aspect of the invention, the UNICO is provided with an antenna 10 that is in charge of the radio frequency-RF signals reception coming from the data gatherer 4, where, through the receptor/transmitter 11 of radio frequency, the communication between the CPU 12 and the data gatherer 4 is performed.

In yet a further aspect of the invention, the CPU 12 is in charge of the logic of the whole UNICO system 3, that is, to receive the data coming from the data gatherer 4, being in charge of the communication protocol, the integrity and consistency of the received or transmitted data, the analysis and the sending of data to the memory 13, which is in charge of the storage of the data coming from the data gatherer 4.

In yet a further aspect of the invention, the data gathering means has a body with its own design, electric circuit and dedicated software with all of the necessary functions for the fleet management, and it is integrated to an equipment for the measurement of groove deepness and pressure.

In yet a further aspect of the invention, the data gathering means comprises an articulated extensor antenna 20, a resistant plastic box 21, that keeps the electronic circuit 22, and a grasping handle, with support for the forearm 23 that provides better comfort for the equipment use. The extensor antenna 20 allows the utilization of the reader for the checking of the internal tires in vehicles equipped with double rolling device and the reading of the external tires at places with limited room, and because the antenna articulation allows the reading of the transponders located at the internal side of the tire and the reading of transponders located at the internal tire of vehicles with double rolling device.

In yet a further aspect of the invention, the box (21) is made of plastic material that is resistant to bad weather, with sealing against water and dust.

The grasping handle, with the support for the forearm (23), allows the offsetting of the torsion force in the user's wrist, due to the antenna weight.

In yet a further aspect of the invention, the electronic circuit 22 is composed of a printed circuit plaque 30, a microcontroller 31, a flash memory 32, a liquid crystal screen 33, a keyboard 34, a circuit for reading and recording of transponders 35, a battery circuit 36 and rechargeable batteries 37, a real-time device 38, a Bluetooth transmitter-receptor, a GPRS modem 40 and an USB exit 41. At the microcontroller memory 31 stays the software that controls all of the hardware and performs the specific functions for the fleet management. At the flash memory 32, it is stored the data gatherings, the registrations of tires and vehicles, the events of tire installation in a vehicle and the events of uninstallation of the tires, the events of tire inventory auditing and the pending items generated during the tasks, which will have to be treated, later on, by the user.

In yet a further aspect of the invention, liquid crystal screen 33 is graphical with resolution of at least 128×64 points, and it has the interface function with the user.

In yet a further aspect of the invention, the circuit for reading and recording of transponders 35 is in charge of the generation of the electric signal sent to the antenna that creates the electromagnetic field, which turns the transponder on and it is also in charge of the reception, conversion and filtration of the transponder response signal, sending, to the microcontroller, a digital and noiseless information.

In yet a further aspect of the invention, the battery circuit 36 is in charge of the reader feeding through the external feeding source and battery recharging, and the batteries 37, that are utilized, are rechargeable.

In yet a further aspect of the invention, the real-time device 38 is in charge of the supply to the microcontroller, and consequently to the software, of the instantaneous data and time, and this information is recorded together with each data gathering or event performed by the data gatherer.

In yet a further aspect of the invention, the Bluetooth transmitter and receptor 39 perform the integration of the data gatherer 4 with the measurer of tire groove deepness and pressure and with the electronic hodometer that provides the kilometer counting and other vehicle data.

In yet a further aspect of the invention, the GPRS modem 40 sends the gathered data to a remote databank through the TCP/IP connection in the Internet.

In yet a further aspect of the invention, the GPRS modem 40 connects to a specific IP address and, through a protocol as defined by the software, it transmits all of the data gathering, the registration of tires and vehicles, the events of installation of a tire in a vehicle and the events of uninstallation of the tires, the events of tire inventory auditing and the pending items generated during the tasks, which will have to be treated, later on, by the user.

In yet a further aspect of the invention, the data transmitted by the GPRS modem 40 stay available for consultation in the Internet by means of an own "site" or they can be downloaded to a software for fleets management, being installed in a PC.

In yet a further aspect of the invention, an USB exit 34 is utilized for the same function of the GPRS modem 40 at areas that have no GPRS signal.

In yet a further aspect of the invention, the software of the transponder reader is dedicated to the task of fleets management and it is composed of the functions of: registration of tires, registration of vehicles, installation of tires, uninstallation of tires, interchange of tires, replacement of hodometer, data gathering, checking of tires, inventory auditing, auditing of tires, checking the tires, checking the vehicles, clock adjustment, configuration of the reader, sending the data through GPRS and sending the data through USB.

The system, being hereby presented, preferably has one, several or all of the following applications:
- storage of data about wearing out of tires;
- storage of data about pressure and temperature of the tire operation in fleets of heavy vehicles;
- storage of data about hours and kilometers as run by the tires;
- storage of data about the place of the tires in the vehicles;
- gathering of vital data about the motor operation (integration with a vehicle electronic unit);
- receiving of data from a RFID chips collector;
- automatic presentation of all of the data at an Internet "site".

The system, being hereby presented, preferably has one, several or all the following functions:
- to show the wearing out of the tires as per the maximum utilization and for the replacements schedule;
- to show the pressures and temperature for the effective control of them, so as to increase the useful life of the tires and the consequent reduction of the operational costs of the transportation fleets;
- to show the places of the tires, so as there can be tires interchanges for the consequent useful life increase of the tires;
- to reduce the risks of robbery or changes of tires;
- to increase the effective control for a better management of tires in the fleets;
- to elaborate elements for performance analysis of the tires, through the efforts performed;
- to gather data from the electronic units of the vehicles with the purpose of making viable the analysis of defects, not requiring that the vehicles are at a specialized workshop and also performance analysis of the tires as a function of the way how the drivers take care of the driving.

The present invention will be better understood with the detailed description of an embodiment of the invention and through the attached figures, showing the invention just in an exemplifying way.

DETAILED DESCRIPTION OF THE INVENTION

Figure 1:
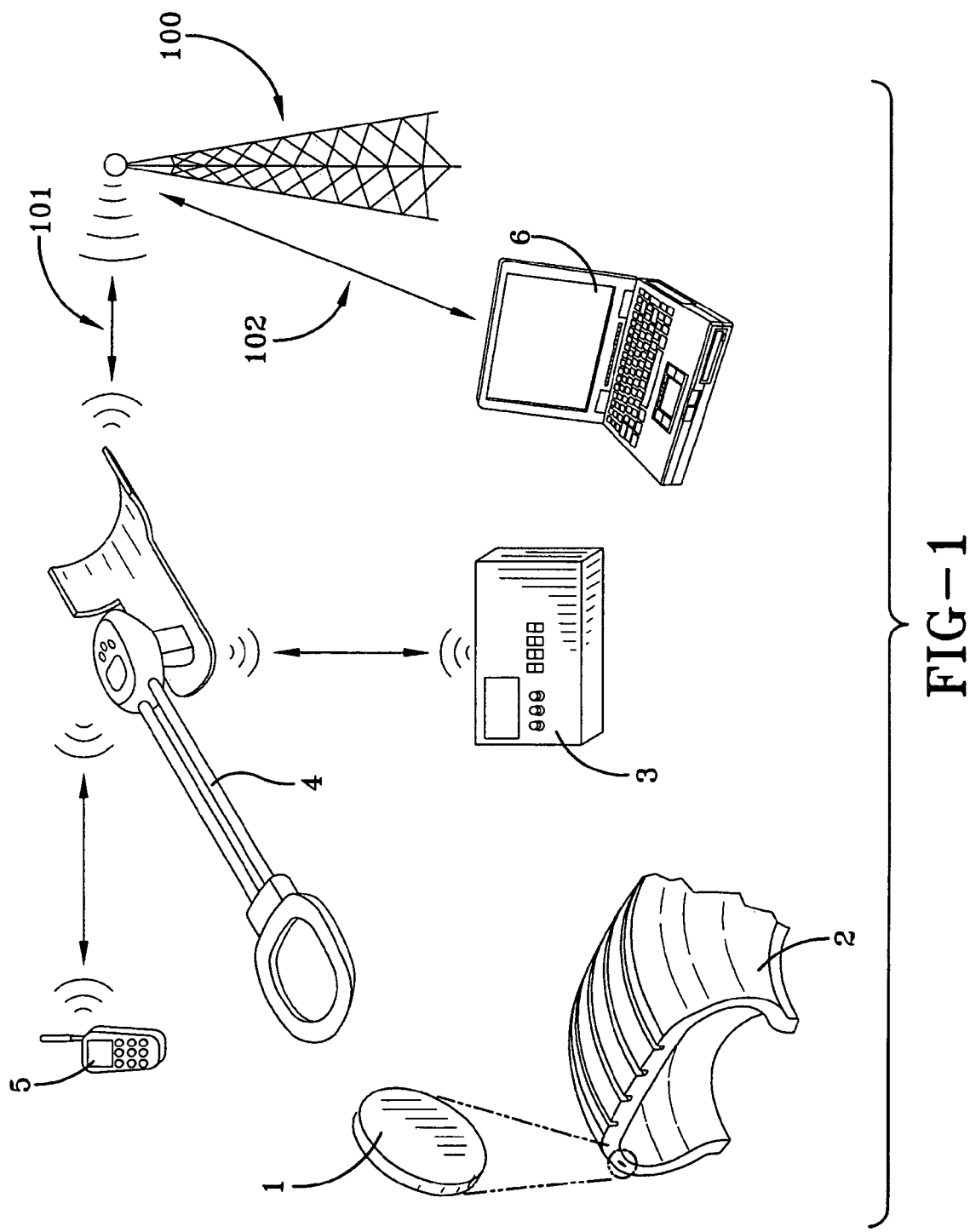
FIG. 1—Block diagram of the system according to the invention
Figure 2:
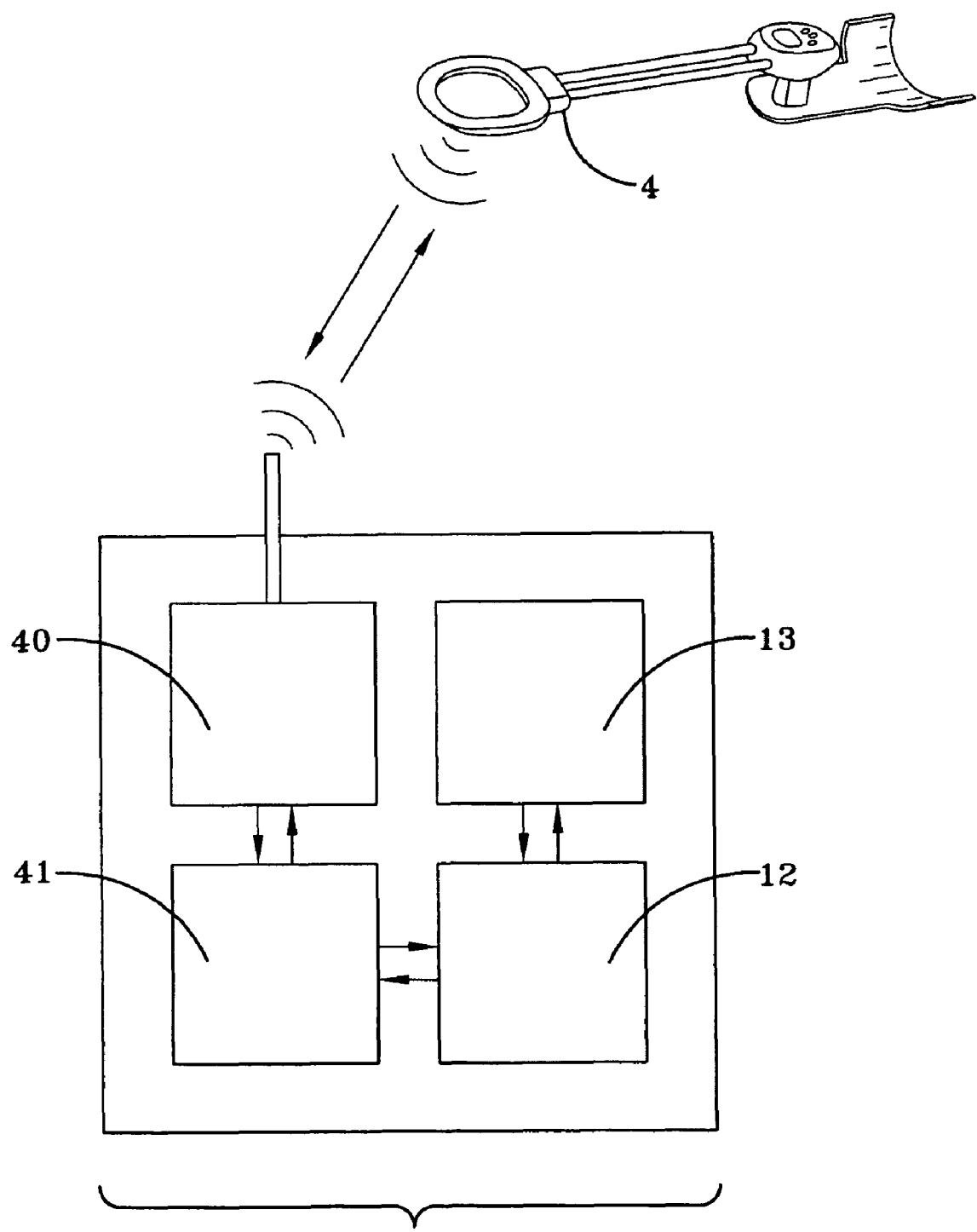
FIG. 2—Blocks diagram of the control unit ("UNICO")
Figure 3:
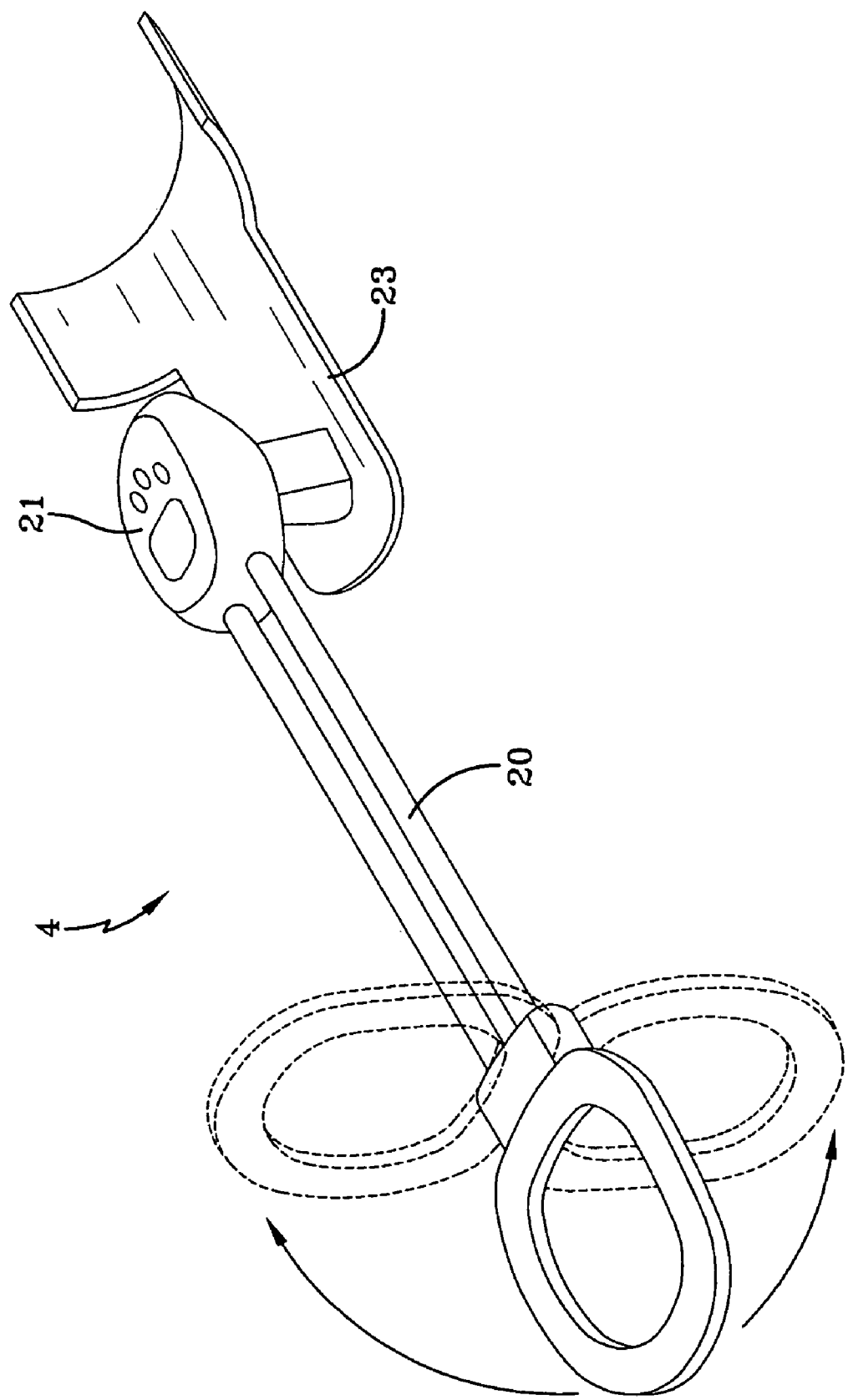
FIG. 3—Perspective view of a data gathering means according to the invention
Figure 4:
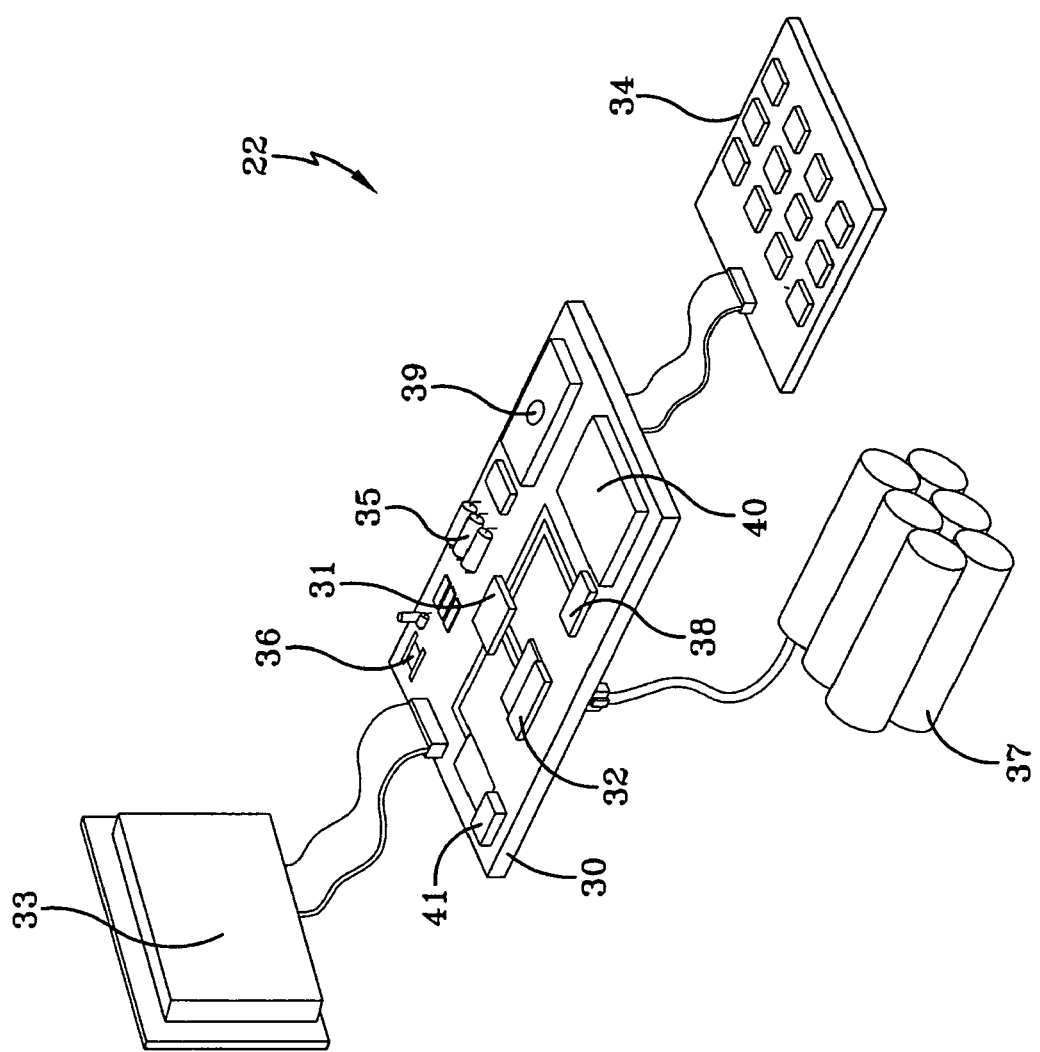
FIG. 4—Elements of the electronic circuit of the data gathering means

In accordance with the Figures as presented, the system for fleets management includes a passive transponder 1 "read/write", preferably a RFID transponder, that is placed in the interior of each tire 2 by any conventional method as utilized in the market, for the identification of the tires. It is also installed in the vehicle a control unit 3 ("UNICO") for identification and storage of vehicle data, such as data about the vehicle identification and the tires, the respective data about pressure, temperature, groove measures, kilometers driven and/or worked hours, data about the motor operation, gathered from the Vehicle Electronic Unit, the place of each tire in the vehicle and useful life status of the tires (new or retreaded). The system for fleets management further includes a data gathering means 4 that performs the tire transponder reading indicated on the gatherer screen that, in this way, knows the prior and present tire historical data; and a data providing means 5 being reader of the pressure and the groove deepness 5 that complements the information. These data are sent from the gatherer 4 to the UNICO 3 and also by GPRS (alternatively by USB) to a remote database 6 (see the wireless the communication 101, 102 via an antenna 100 of the data gathering means 4 with a computer comprising a database 6), where a fleets management software receives the data and the events as gathered from the remote base 6 allowing the information analysis.

The said control unit 3 is utilized as a unit that locally stores the data about the vehicle and the tires, avoiding the need of a database at the gatherer or consultation to a remote database; the control unit 3 is provided with an antenna 10 that is in charge of receiving the radio frequency-RF signals coming from the data gatherer 4, where, through the receptor/transmitter 11 of radio frequency, is performed the communication between the CPU 12 and the data gatherer 4. The said CPU 12 is in charge of the logic of the whole UNICO system 3, that is, to receive the data coming from the data gatherer 4, to be in charge of the communication protocol, the integrity of the received and or transmitted data, the analysis and the sending of the data to the memory 13, which is in charge of storing the data coming from the data gatherer 4.

The said data gatherer 4 comprises a body with its own design, electronic circuit and dedicated software with all of the necessary functions for the fleet management, and it is integrated to an equipment for the measurement of the groove deepness and the pressure. The body of the data gatherer 4 comprises a jointed extensor antenna 20, a resistant plastic box 21, that keeps the electronic circuit 22, and a grasping handle, with support for the forearm 23 that provides more comfort for the use of the equipment. The extensor antenna 20 allows the utilization of the reader for the checking of the internal tires in vehicles equipped with double rolling device (total extension) and the reading of the external tires at places with limited space (minimum extension). The antenna articulation allows the reading of transponders located at the internal side of the tire and the reading of transponders at the internal tire of vehicle with double rolling device. The box 21 is made of plastic material that is resistant to bad weather, with sealing against water and dust. The grasping handle, with the support for the forearm 23, allows the reader utilization for a prolonged period with the user not getting tired as the weight of the antenna, that makes a torsion force in the user's wrist, is offset.

The electronic circuit 22 comprises a printed circuit plaque 30, a microcontroller 31, a flash memory 32, a liquid crystal screen 33, a keyboard 34, a circuit for reading and recording of transponders 35, a battery circuit 36 and rechargeable batteries 37, a real-time device 38, a transmitter-receptor Bluetooth 39, a GPRS modem 40 and an USB exit 41.

The software, that controls all of the hardware and performs the specific functions for the fleet management, stays at the microcontroller memory 31. At the flash memory 32, it is stored the data gatherings, the recordings of tires and vehicles, the events of installation of a tire in a vehicle and the events of uninstallation of the tires, the events of tire inventory auditing and the pending items, generated during the tasks, that will have to be treated, later on, by the user.

The liquid crystal screen 33 is graphical with a resolution of 128×64 points, and it has the function of interface with the user. Through the liquid crystal screen, for example, the equipment software indicates the reading sequence of the vehicle tires. The keyboard 34 is made of silicone, it is colorful, having 12 keys that allow the entry of alphanumeric data. The circuit for reading and recording of transponders 35 is in charge of the generation of the electric signal that is sent to the antenna that creates the electromagnetic field, which turns the transponder on. It is also in charge of the reception, conversion and filtration of the response signal of the transponder, sending to the microcontroller a digital and noiseless information. The battery circuit 36 is in charge of the reader feeding through the external feeding source and it recharges the battery. The batteries 37 that are utilized are rechargeable; they can be easily replaced. The real-time device 38, also known as internal clock, is in charge of providing the instantaneous date and time to the microcontroller and, consequently, to the software. This information is recorded together with each data gathering or event as performed by the gatherer. The Bluetooth transmitter and receptor 39 utilizes class 1 Bluetooth technology with a 100 meter reach. It is utilized for the integration of the reader with the measurer of the groove deepness and the pressure, and with the electronic hodometer that provides the kilometer counting and other data of the vehicle or cart. The GPRS 40 modem is utilized to send the gathered data to a remote database through the TCP/IP connection in the Internet. The GPRS modem 40 is connected to a specific IP and through a protocol, as defined by the software, it transmits all of the data gatherings, the registrations of tires and vehicles, the events of a tire installation in a vehicle and the events of tires uninstallation, the events of tires inventory auditing and the pending items, generated during the tasks, which must be treated, later on, by the user. The transmitted data are available for consultation in the Internet through an own "site" or they can be downloaded to a software for management of the fleets as installed in a PC. The USB exit 34 is utilized for the same function in areas that have no GPRS signal. In that case, the sending of the data to the remote database will have to be performed with the help of a PC.

The software of the transponder reader is dedicated to the fleet management task. It comprises functions for: registration of tires, registration of vehicles, installation of tires, uninstallation of tires, interchange of tires, replacement of hodometer, data gathering, checking of tires, inventory auditing, auditing of tires, checking of tires, checking of vehicles, clock adjustment, reader configuration, sending the data through GPRS and sending the data through the USB.

The registration functions are utilized only for new tires and vehicles, at the time the identification transponder is installed. The tires must always be registered first and just after that, the vehicle must be registered. For the tire registration, it must be informed the tire fire marking, the total kilometers that the tire rolled, the number of grooves and the deepness of each groove.

For the vehicle registration, it must be informed the vehicle code, the present hodometer counting of the vehicle, the configuration of tires, spare tires and axles of the vehicle and which tire is mounted in each position. All of the data are recorded by the reader of the transponder that identifies the tire or the vehicle and, later on, they are sent to the remote database.

The installation function has as its purpose to inform to the remote database, and to the system, that a new tire was installed in the vehicle, the position, the hodometer counting and the date and time of the installation. Before performing the installation of a tire, the uninstallation should be made.

The uninstallation function has as its purpose to inform to the remote databank and to the system that a tire was uninstalled in the vehicle, the hodometer counting, the data and the time of the uninstallation, the deepness of the groove and the destination of the tire.

The gathering function is basically a checking of each tire mounted in the vehicle, taking note of the deepness of each groove and the pressure of the tires. Those data are recorded in the tire transponder. In case that there is a replaced tire in the vehicle, the gathering function shows it, and the user can inform the hodometer counting, the date and the time when the replacement occurred. The gathered data are, later on, sent to the remote databank. The gathering function indicates to the user the reading sequence of the vehicle tires.

The checking function is similar to the gathering function, however, it is not needed to perform the measurement of the grooves and the pressure, and the transponder recording.

The tire auditing function checks and replaces the cumulative kilometer quantity and the groove deepness as recorded in the tire tag. It must be utilized only when the data recorded in the tire and in the system were different or when a tire were uninstalled without the measurement of grooves.

The function of inventory auditing is utilized to read the identification, to check the data and to send, to the remote databank and to the system, the listing of tires that are kept as inventory.

The functions of tire and vehicle visualization are utilized to see the data as recorded in the transponder, which identify the tires or the vehicles. The data, read by the reader in the transponder, are shown on the screen. The function of sending data through GPRS transmits the gathered data, registrations and events to the remote databank through a GPRS link. The GPRS is the name given to the data transmission through the GSM network. The GPRS makes possible the direct access to the Internet for the data gathered in the field.

With a fleet management system with RFID and controller for the data utilized in the same one, got in this way, its operation is very simple, where in a simplified way, whenever the fleet buys new tires, the registration is made by utilizing the data gatherer 4. The new tires are identified with a transponder. It is informed to the system, through the registration function, the listing of the transponder number and the tire number, in addition to the tire grooves deepness and the quantity of the initial hodometer counting. All of the data are also recorded in the tire identification transponder. The data gatherer 4 generates the tire registration events in its memory. Immediately, the vehicle registration is made, also utilizing the data gatherer 4. The vehicle is identified with a transponder. Through the information function, it is informed to the system the listing of the transponder number and the vehicle number, in addition to the configuration of axles and tires of the vehicle and the hodometer counting of the vehicle. The data gatherer 4 generates the registration event in its memory. The function of vehicle registration is also automatically performed at the time of the installation of the tires in the vehicle. The user informs the tire that will be installed at each position, through the transponder reading of the tire. The data gatherer 4 generates the installation events in its memory. Whenever the vehicle comes back to the fleet after a trip, the gathering function is performed. By using the data gatherer 4, the UNICO 3 of the vehicle is read and, immediately, the transponders of each tire are read, following the indicated ordering. In order to read the identification transponder of the tire, the antenna of the data gatherer must sweep the internal and external faces of the tire up to locating the transponder. In order to do that, the data gatherer 4 utilizes an extensible and articulated antenna 20. In each tire, it is also measured the deepness of the grooves and the pressure, through a specific device to do that. The values, measured with an accessory, are received via Bluetooth 39 by the data gatherer 4 and they are shown on the screen. The data gatherer 4 generates the event of data gathering in its memory. Whenever there is a tire replacement, the user will inform the system by utilizing the uninstallation and installation functions or the tire interchange function. The replacement event is generated by the data gatherer 4 indicating which tire was uninstalled, the destination of that tire and the grooves deepness, which tire was installed, the position, the kilometers rolled, the date and the time of the installation. The data gatherer 4 generates the events of installation and uninstallation in its memory. Finally, the events, as recorded in the memory of the data gatherer, are sent by GPRS 40 to the remote databank and then they can be worked in the system, issuing diverse reports and analyses.

Advantages

The system according to the invention can include one, several or all of the following advantages:

the passive transponder has an exclusive, inviolable number. It cannot be cloned with the same number; that impedes the replacement of a new tire by an old tire with the same identification;

inexistence of errors regarding identification, gathering and transcription of data in the system;

the data of groove deepness, gauging pressure and the quantity of kilometers already run by the tire (accumulated along the useful life of the same one) remain recorded in the passive transponder that identifies the tire;

the UNICO utilization as the control unit 3 that locally stores the data related to the vehicle and the tire, avoiding the need of a database at the data gatherer or consultation to a remote database;

the utilization of a data gatherer equipped with internal memory, RFID reader, transmission by GPRS and sensors for pressure and measurement of groove deepness. The gatherer indicates occasional replacement of tires and it automatically generates the events of installation of a new tire and uninstallation of the prior tire.

The data gathering means 4 according to the invention can include one, several or all of the following advantages:

exclusive design for the function of transponder reading in tires, that provides better usability;

dedicated software for the task of fleets management, not being necessary to carry a computer, notebook or palmtop to the field, coupled to the transponder conventional reader;

the integration of the reader with the accessories, electronic hubdometer and measurer of the groove deepness and pressure, being that these data are transmitted, to the reader, by Bluetooth and they are shown on the screen during the gathering;

the transmission to the field of the gathered data, via GPRS, to the remote database, without the need of carrying the reader to a computer in order to download the data.

The invention claimed is:

1. Data gathering means which is configured to be able to wirelessly read or receive data from a transponder (1), said data being present data and/or historical data of a tire (2), and which configured to be able to receive tire pressure data and/or the tire groove deepness data from a data providing means (5), said data providing means (5) being integrated into or associated with said data gathering means (4), wherein the data gathering means (4) is configured to be able to provide the data received from the transponder (1) and the data received from the data providing means (5) to a control unit (3) associated with a vehicle, and wherein the data gathering means (4) is configured to be able to wirelessly provide data received from the transponder (1) and data received from the data providing means (5) to a remote database (6).

2. The data gathering means of claim 1 being configured to wirelessly provide data received from the transponder (1) and data received from the data providing means (5) to the control unit (3).

3. The data gathering means of claim 1 wherein the data providing means (5) is configured to be able to measure a tire pressure and/or a tire groove deepness.

4. The data gathering means of claim 1 comprising a GPRS modem (40) which is configured to be able to send data to the remote database (6) using a TCP/IP internet connection.

* * * * *